(12) United States Patent
Wang et al.

(10) Patent No.: US 12,349,072 B2
(45) Date of Patent: Jul. 1, 2025

(54) METHOD FOR TRIGGERING TERMINAL TO START DISCOVERY PROCESS VIA NETWORK DEVICE, TERMINAL DEVICE, AND NETWORK DEVICE

(71) Applicant: VIVO MOBILE COMMUNICATION CO., LTD., Guangdong (CN)

(72) Inventors: Wen Wang, Dongguan (CN); Zhenhua Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 402 days.

(21) Appl. No.: 17/848,133

(22) Filed: Jun. 23, 2022

(65) Prior Publication Data

US 2022/0322237 A1 Oct. 6, 2022

Related U.S. Application Data

(63) Continuation of application No. PCT/CN2020/142209, filed on Dec. 31, 2020.

(30) Foreign Application Priority Data

Jan. 2, 2020 (CN) .......................... 202010002061.7

(51) Int. Cl.
*H04W 52/02* (2009.01)
(52) U.S. Cl.
CPC .............................. *H04W 52/0235* (2013.01)
(58) Field of Classification Search
CPC ... H04W 8/00; H04W 52/02; H04W 56/0015; H04W 72/00; H04W 72/048;
(Continued)

(56) References Cited

U.S. PATENT DOCUMENTS 9,197,535 B1 * 11/2015 Nagawade et al. ..... H04L 45/02
10,869,266 B2 * 12/2020 Gupta et al. ...... H04W 52/0203
(Continued)

FOREIGN PATENT DOCUMENTS

CN     101772199 A     7/2010
CN     103428679 A     12/2013
(Continued)

OTHER PUBLICATIONS (CN 102317884 A) >>> for Supporting a Wake-up Trigger Signal of the Plurality of User Interface, Environment and/or a Virtual Machine (see title) (Year: 2012).*
(Continued)

*Primary Examiner* — Meless N Zewdu
(74) *Attorney, Agent, or Firm* — Harness, Dickey & Pierce, P.L.C.

(57) ABSTRACT

A trigger discovery method includes: sending a wake-up discovery request to a network device, where the wake-up discovery request is used for requesting the network device to trigger a second terminal to start a discovery process, and there is a subscription binding relationship between the second terminal and the first terminal; and starting the discovery process in a case that a response message sent by the network device is received, where the response message is used for indicating that the second terminal has started the discovery process.

20 Claims, 9 Drawing Sheets

(58) Field of Classification Search
CPC . H04W 74/0833; H04W 76/14; H04W 88/04; H04W 8/005; H04W 52/0235; H04W 12/06; H04W 68/005; H04W 76/28; H04W 52/0229; H04W 48/14; H04W 52/0225; H04W 68/00; H04W 48/08; H04W 28/0875; H04W 8/20; H04W 8/24; H04W 4/029; H04W 8/08; H04W 8/14; H04W 52/0209; H04W 30/70; H04W 52/0206; H04W 52/0219; Y02D 30/70
See application file for complete search history.

(56) References Cited

U.S. PATENT DOCUMENTS

| | | | | |
|---|---|---|---|---|
| 11,736,927 | B2* | 8/2023 | Johnsson et al. | H04W 8/005 |
| 2010/0165882 | A1 | 7/2010 | Palanki et al. | |
| 2014/0357269 | A1* | 12/2014 | Zhou et al. | H04W 8/005 |
| 2015/0063095 | A1 | 3/2015 | Deng et al. | |
| 2015/0156620 | A1 | 6/2015 | Morita | |
| 2015/0245192 | A1 | 8/2015 | Wu et al. | |
| 2015/0305077 | A1 | 10/2015 | Johnsson et al. | |
| 2015/0341974 | A1 | 11/2015 | Wu et al. | |
| 2016/0014590 | A1* | 1/2016 | Agiwal et al. | H04W 8/005 |
| 2016/0057604 | A1 | 2/2016 | Luo et al. | |
| 2018/0063784 | A1* | 3/2018 | Abraham et al. | H04W 52/0216 |
| 2018/0081558 | A1* | 3/2018 | Ish et al. | G06F 3/0607 |
| 2018/0234919 | A1 | 8/2018 | Tsuda et al. | |
| 2018/0270801 | A1 | 9/2018 | Novlan et al. | |
| 2019/0090198 | A1 | 3/2019 | Zhao | |
| 2019/0253869 | A1 | 8/2019 | Xu et al. | |
| 2020/0053647 | A1* | 2/2020 | Chae et al. | H04W 52/0229 |
| 2020/0344837 | A1 | 10/2020 | Pragada et al. | |

FOREIGN PATENT DOCUMENTS

| | | | |
|---|---|---|---|
| CN | 103856927 A | 6/2014 | |
| CN | 103906266 A | 7/2014 | |
| CN | 104113851 A | 10/2014 | |
| CN | 104254145 A | 12/2014 | |
| CN | 106658389 A | 5/2017 | |
| EP | 2654329 A2 | 10/2013 | |
| EP | 2833694 A2 | 2/2015 | |
| EP | 2654329 A3 | 8/2017 | |
| JP | 2008109306 A | 5/2008 | |
| JP | 2015520556 A | 7/2015 | |
| JP | 2015527000 A | 9/2015 | |
| WO | WO-2012040251 A2 * | 3/2012 | H04W 36/14 |
| WO | WO-2013183729 A1 | 12/2013 | |
| WO | WO-2017051859 A1 | 3/2017 | |
| WO | WO-2017166961 A1 | 10/2017 | |
| WO | WO-2018072157 A1 | 4/2018 | |

OTHER PUBLICATIONS (WO 2016060175 A1) >>> User Device, Base Station, and Discontinuous Reception Method (see title) (Year: 2016).*
(JP 6392228 B2) >>> Method for Triggering a Mobile Device to Send a Discovery Message Configured to Advertise a Service (see title) (Year: 2018).*
(TW 201424441 A) >>> Method and Apparatus for Performing Device-to-device Discovery (see title) (Year: 2014).*
(CN 1863191 A) >>> The Regeneration Section Trace Byte Neighbour Discovery Method and System for Realizing Multiplex Section (see title) (Year: 2006).*
Extended European Search Report regarding European Patent Application No. 20909817.7-1216/4057655, dated Dec. 5, 2022.
"Network-triggered discovery," vivo, SA WG2 Meeting #136AH, S2-2000205 (revision of S2-190xxxx), dated Jan. 17, 2020.
First Office Action regarding Indian Patent Application No. 202217036813, dated Nov. 11, 2022.
First Office Action regarding Japanese Patent Application No. 2022-536656, dated Jun. 27, 2023. Translation provided by Bohui Intellectual Property.
Second Office Action regarding Japanese Patent Application No. 2022-536656, dated Dec. 1, 2023. Translation provided by Bohui Intellectual Property.
International Search Report and Written Opinion of the International Searching Authority regarding International Patent Application No. PCT/CN2020/142209, dated Mar. 26, 2021. Translation provided by Bohui Intellectual Property.
First Office Action regarding Chinese Patent Application No. 202010002061.7, dated Oct. 28, 2021. Translation provided by Bohui Intellectual Property.
Second Office Action regarding Chinese Patent Application No. 202010002061.7, dated Mar. 22, 2022. Translation provided by Bohui Intellectual Property.

* cited by examiner

METHOD FOR TRIGGERING TERMINAL TO START DISCOVERY PROCESS VIA NETWORK DEVICE, TERMINAL DEVICE, AND NETWORK DEVICE

CROSS-REFERENCE TO RELATED APPLICATIONS

This application is a Bypass Continuation application of PCT/CN2020/142209 filed on Dec. 31, 2020, which claims priority of Chinese Patent Application No. 202010002061.7 filed on Jan. 2, 2020, which are incorporated herein by reference in their entirety.

TECHNICAL FIELD

The present application relates to the communications field, and in particular, to a trigger discovery method, a terminal device, and a network device.

BACKGROUND

There is blindness in the start of a discovery process between devices. A relay technology in a radio communications system is used as an example. In the relay technology, one or more relay nodes are added between a base station and a terminal and are responsible for forwarding a radio signal once or repeatedly. That is, the radio signal needs to pass through a plurality of hops before the radio signal can reach the terminal. The radio relay technology can be used for expanding cell coverage and making up for blind spots of the cell coverage, and can improve a cell capacity by spatial resource multiplexing. For indoor coverage, the relay technology can play a role in overcoming penetration loss and improving the quality of the indoor coverage. A simple two-hop relay is used as an example. A radio relay divides a "base station-terminal" link into two links, namely, a "base station-relay node" link and a "relay node-terminal" link, so that a link with relatively poor quality can be replaced with two links with relatively high quality to implement a higher link capacity and better coverage.

SUMMARY

Objectives of embodiments of the present application are to provide a trigger discovery method, a terminal device, and a network device.

According to a first aspect, an embodiment of the present application provides a trigger discovery method, performed by a first terminal. The method includes: sending a wake-up discovery request to a network device, where the wake-up discovery request is used for requesting the network device to trigger a second terminal to start a discovery process, and there is a subscription binding relationship between the second terminal and the first terminal; and starting the discovery process in a case that a response message sent by the network device is received, where the response message is used for indicating that the second terminal has started the discovery process.

According to a second aspect, an embodiment of the present application provides a trigger discovery method, performed by a second terminal. The method includes: receiving a discovery start command sent by a network device, where the discovery start command is generated by the network device based on a wake-up discovery request sent by a first terminal, and there is a subscription binding relationship between the second terminal and the first terminal; and starting a discovery process based on the discovery start command.

According to a third aspect, an embodiment of the present application provides a trigger discovery method, performed by a network device. The method includes: receiving a wake-up discovery request sent by a first terminal, where the wake-up discovery request is used for requesting the network device to trigger a second terminal to start a discovery process, and there is a subscription binding relationship between the second terminal and the first terminal; and sending a discovery start command to the second terminal based on the wake-up discovery request; and sending a response message to the first terminal after the second terminal starts the discovery process based on the discovery start command, where the response message is used for indicating that the second terminal has started the discovery process.

According to a fourth aspect, an embodiment of the present application further provides a terminal device, including: a first sending module, configured to send a wake-up discovery request to a network device, where the wake-up discovery request is used for requesting the network device to trigger a second terminal to start a discovery process, and there is a subscription binding relationship between the second terminal and the first terminal; and a first starting module, configured to start the discovery process in a case that a response message sent by the network device is received, where the response message is used for indicating that the second terminal has started the discovery process.

According to a fifth aspect, an embodiment of the present application further provides a terminal device, including: a second receiving module, configured to receive a discovery start command sent by a network device, where the discovery start command is generated by the network device based on a wake-up discovery request sent by a first terminal, and there is a subscription binding relationship between the second terminal and the first terminal; and a second starting module, configured to start a discovery process based on the discovery start command.

According to a sixth aspect, an embodiment of the present application further provides a network device, including: a fourth receiving module, configured to receive a wake-up discovery request sent by a first terminal, where the wake-up discovery request is used for requesting the network device to trigger a second terminal to start a discovery process, and there is a subscription binding relationship between the second terminal and the first terminal; and a second sending module, configured to send a discovery start command to the second terminal based on the wake-up discovery request; and a third sending module, configured to send a response message to the first terminal after the second terminal starts the discovery process based on the discovery start command, where the response message is used for indicating that the second terminal has started the discovery process.

According to a seventh aspect, an embodiment of the present application further provides a terminal device, including: a memory, storing computer program instructions; and a processor, when executing the computer program instructions, implementing the trigger discovery method according to the first aspect or the second aspect.

According to an eighth aspect, an embodiment of the present application further provides a network device, including: a memory, storing computer program instructions; and a processor, when executing the computer program instructions, implementing the trigger discovery method according to the third aspect.

According to a ninth aspect, an embodiment of the present application further provides a non-transitory computer-readable storage medium. The non-transitory computer-readable storage medium stores instructions, and the instructions, when run on a computer, cause the computer to perform the trigger discovery method according to the first aspect, the second aspect, or the third aspect.

BRIEF DESCRIPTION OF THE DRAWINGS

To describe the technical solutions in the embodiments of the present application or in the related art more clearly, the following briefly describes the accompanying drawings required for describing the embodiments or the related art. Apparently, the accompanying drawings in the following description show merely some embodiments of the present application, and persons of ordinary skill in the art may still derive other drawings from these accompanying drawings.

DETAILED DESCRIPTION

The technical solutions of embodiments of the present application are clearly described below with reference to the accompanying drawings in the embodiments of the present application. Obviously, the described embodiments are a part rather than all of the embodiments of the present application. All other embodiments obtained by a person of ordinary skill in the art based on the embodiments of the present application shall fall within the protection scope of the present application.

The technical solutions of the present application may be applied to various communications systems, for example: a global system for mobile communications (GSM), a code division multiple access (CDMA) system, a wideband code division multiple access (WCDMA) system, a general packet radio service (GPRS), long term evolution advanced (LTE-A), and new radio (NR).

A terminal device (User Equipment, UE), also referred to as a mobile terminal, a mobile terminal device, or the like, may communicate with one or more core networks through a radio access network (RAN). The user equipment may be a terminal device, for example, a mobile phone (also referred to as a "cellular" phone) and a computer with a terminal device. For example, the user equipment may be a portable, pocket-sized, handheld, computer built-in, or in-vehicle mobile apparatus, which exchanges languages and/or data with the radio access network.

A network device may be a core-network network element located on a network side, for example, an access and mobility management function (AMF) network element, or a policy control function (PCF) network element. In addition, the network device may be alternatively a base station, for example, may be a base transceiver station (BTS) in GSM or CDMA, may be a base station (NodeB) in WCDMA, or may be an evolved base station (eNB, or e-NodeB) in LTE and a base station (gNB) in 5G, which is not limited in the present application.

The relay supported in long term evolution (LTE) or NR is a terminal-to-network side relay (UE-To-Network relay). That is, one end of the relay is connected to UE, and the other end is connected to a network side. A terminal connected to the relay may be referred to as a remote terminal (Remote UE), and a terminal used as the relay may be referred to as a relay terminal (Relay UE). There are two following relay discovery manners.

Figure 1:
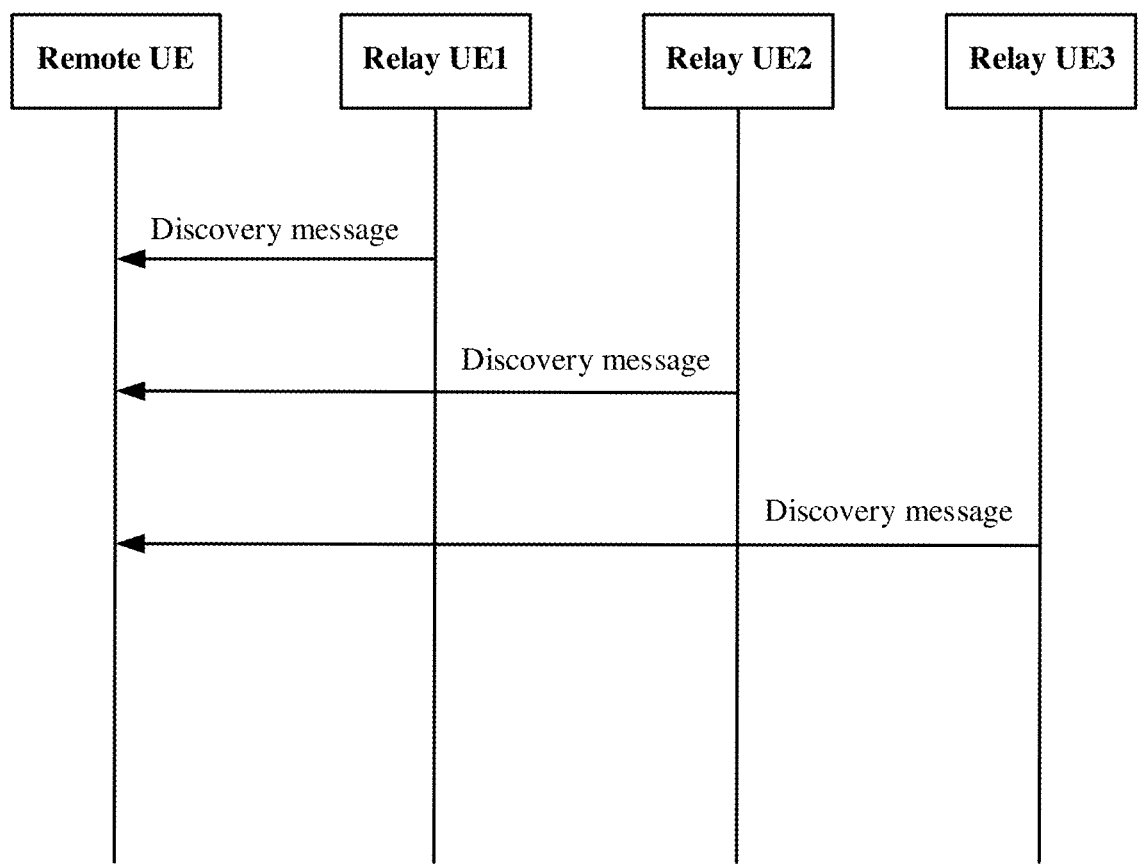
FIG. 1 is a schematic flowchart of a discovery mode in a discovery process in the related art.

In Manner 1, as shown in FIG. 1, for a proximity service, if the Relay UE hopes that proximal UE may establish a UE-To-Network relay connection through the Relay UE, the Relay UE broadcasts a discovery message to declare that it is the Relay UE and may perform a UE-To-Network relay for the service.

Figure 2:
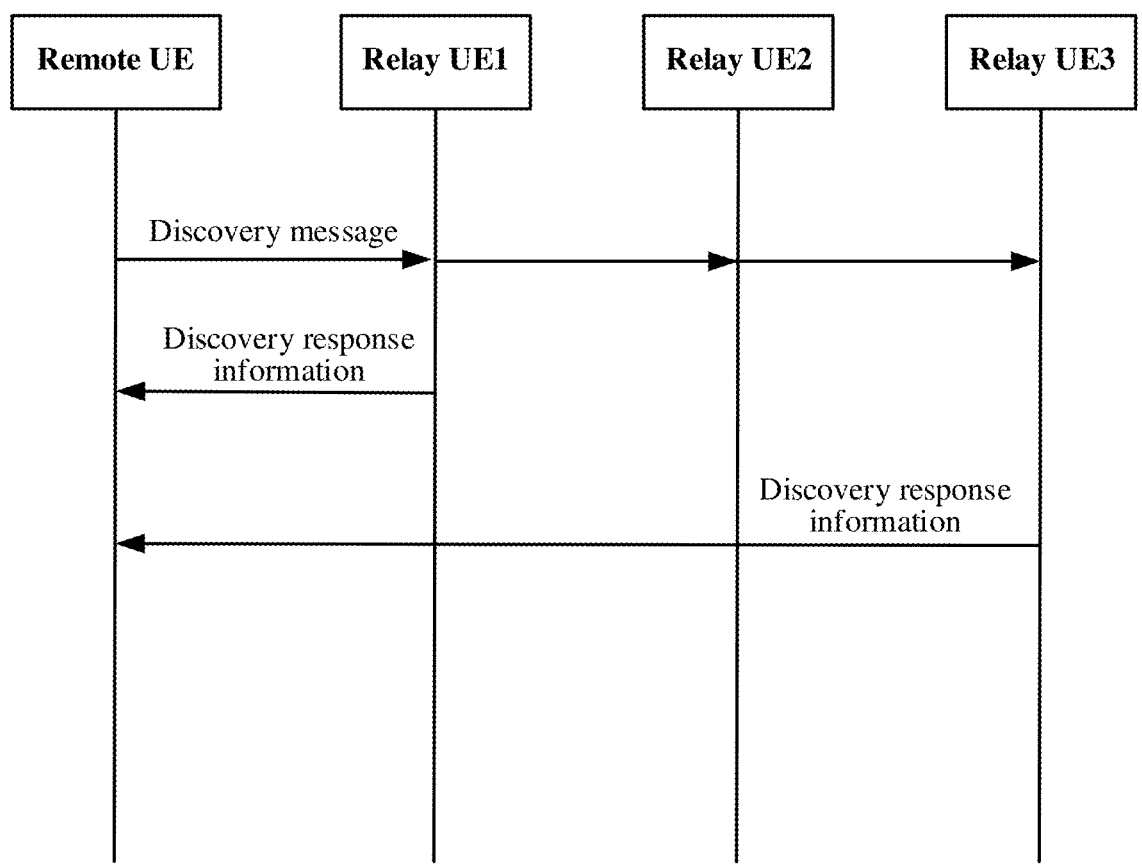
FIG. 2 is a schematic flowchart of another discovery mode in a discovery process in the related art.

In Manner 2, for a proximity service, if the Remote UE hopes to establish a UE-To-Network relay connection through a proximal Relay UE, the Remote UE broadcasts a discovery message for discovering the proximal Relay UE. If the proximal Relay UE authorizes and is willing to establish the UE-To-Network relay connection, the proximal Relay UE returns discovery response information to the Remote UE. As shown in FIG. 2, a Relay UE1 and a Relay UE3 are willing to establish the UE-To-Network relay connection with the Remote UE.

It can be seen from the above two manners of the start of a discovery process that there is blindness in current start of a discovery process, especially a discovery process between devices with a subscription binding relationship. To establish a relay communication connection between the devices with the subscription binding relationship, a device may keep broadcasting a discovery message or monitoring a discovery message to discover another device, which clearly results in increases in the energy consumption of the devices.

The technical solutions provided in the embodiments of the present application are described in detail below with reference to the accompanying drawings.

Figure 3:
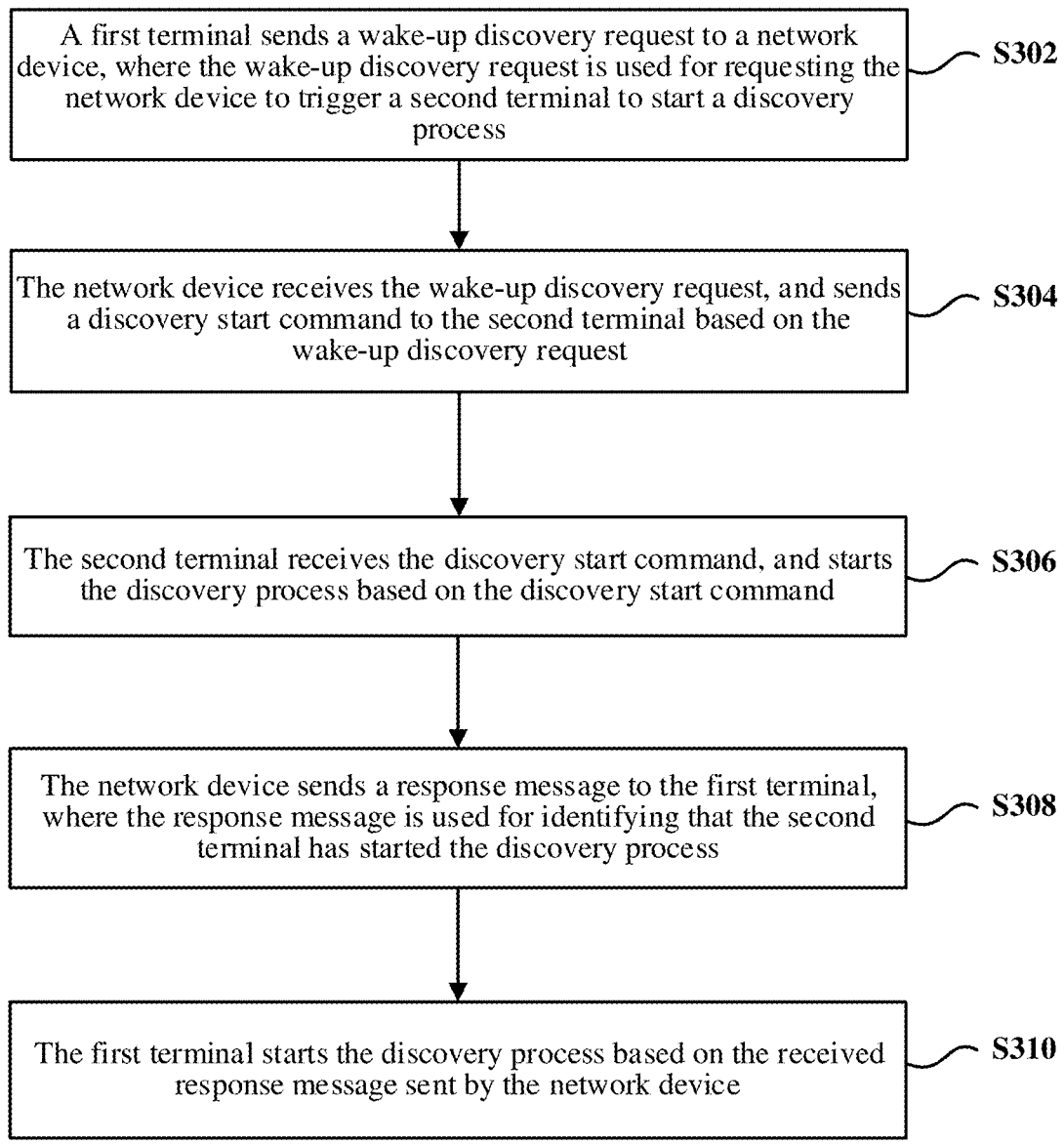
FIG. 3 is a schematic flowchart of a trigger discovery method according to an embodiment of the present application.

FIG. 3 is a schematic flowchart of a trigger discovery method according to an embodiment of the present application. The method may be performed by an electronic device, for example, a terminal device or a network device. In other words, the method may be performed by software or hardware installed on the terminal device or the network device. The method in FIG. 3 is performed by a first terminal, a second terminal, and the network device, and may include the following steps.

S302. The first terminal sends a wake-up discovery request to the network device, where the wake-up discovery request is used for requesting the network device to trigger a second terminal to start a discovery process.

There is a subscription binding relationship between the second terminal and the first terminal. Subscription binding configuration information may include one or more of the following information: identification information of the first terminal, identification information of the second terminal, binding group identification information corresponding to the subscription binding relationship, capability information of the first terminal (for example, whether the first terminal can be used as a relay), capability information of the second terminal (for example, whether the second terminal can be used as a relay), dedicated verification and authentication information, default configuration information (for example, configuration of a default discovery mode, or configuration used as a default relay terminal), or the like. Identification information of a terminal is unique, for example, a media access control (MAC) address and a communication number of the terminal. The binding group identification information may be assigned by the network device, and can uniquely indicate a binding group with the subscription binding relationship.

The subscription binding configuration information may be pre-configured in the first terminal and/or the second terminal, or may be configured by the network device and sent to the first terminal and/or the second terminal before the discovery is triggered. For example, before receiving the wake-up discovery request sent by the first terminal, the network device sends the pre-configured subscription binding configuration information to the first terminal. Alternatively, before sending a discovery start command to the second terminal, the network device sends the subscription binding configuration information to the second terminal.

For example, the first terminal is a mobile phone, and the second terminal is a smart watch. When a contract is signed, the mobile phone is bound with the smart watch through a mobile phone number corresponding to the mobile phone, so that a subscription binding relationship is established between the mobile phone and the smart watch.

The wake-up discovery request may carry one or more of information, for example, the identification information of the first terminal, the identification information of the second terminal, the binding group identification information corresponding to the subscription binding relationship, a discovery mode corresponding to the discovery process, discovery start time, a discovery duration, or the dedicated verification and authentication information. The discovery mode may be any mode shown in FIG. 1 or FIG. 2. The dedicated verification and authentication information is used for performing mutual verification and authentication between the first terminal and the second terminal in the discovery process.

S304. The network device receives the wake-up discovery request, and sends a discovery start command to the second terminal based on the wake-up discovery request.

The discovery start command may carry one or more of information, for example, the discovery mode corresponding to the discovery process, the discovery start time, the discovery duration, or the dedicated verification and authentication information.

In this step, in a case that the wake-up discovery request carries the identification information of the second terminal, the network device sends the discovery start command to the second terminal corresponding to the identification information.

In a case that the wake-up discovery request does not carry the identification information of the second terminal, the network device may send the discovery start command to a terminal that has the subscription binding relationship with the first terminal. Optionally, the network device may determine, based on the identification information of the first terminal and/or the binding group identification information carried in the wake-up discovery request, the second terminal that has the subscription binding relationship with the first terminal, to send the discovery start command to the determined second terminal. Optionally, the network device may send the discovery start command to a default terminal device based on the subscription binding configuration information.

S306. The second terminal receives the discovery start command, and starts the discovery process based on the discovery start command.

S308. The network device sends a response message to the first terminal, where the response message is used for indicating that the second terminal has started the discovery process.

The response message may carry one or more of information, for example, the discovery mode corresponding to the discovery process, the discovery start time, the discovery duration, or the dedicated verification and authentication information.

S310. The first terminal starts the discovery process based on the received response message sent by the network device.

In the embodiments of the present application, a first terminal sends a wake-up discovery request to a network device, to request the network device to trigger a second terminal that has a subscription binding relationship with the first terminal to start a discovery process. The network device sends a discovery start command to the second terminal based on the wake-up discovery request, and the second terminal starts the discovery process based on the sent discovery start command. Then, the network device sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

In an embodiment, in a case that the wake-up discovery request does not carry the discovery mode corresponding to the discovery process, the network device may determine a pre-configured default discovery mode as the discovery mode corresponding to the discovery process before sending the discovery start command to the second terminal, and send the discovery start command carrying the determined discovery mode to the second terminal.

In an embodiment, when performing S306, the second terminal starts the discovery process according to information carried in the discovery start command. Details are as follows.

In a case that the discovery start command carries the discovery mode corresponding to the discovery process, the second terminal starts the discovery process according to the discovery mode carried in the discovery start command.

In a case that the discovery start command carries the discovery start time, the second terminal starts the discovery process according to the discovery start time carried in the discovery start command.

In a case that the discovery start command carries the discovery duration, the second terminal starts the discovery process, and sustains the discovery process according to the discovery duration carried in the discovery start command.

In a case that the discovery start command carries the dedicated verification and authentication information, the second terminal starts the discovery process, and performs verification and authentication on the first terminal in the discovery process based on the dedicated verification and authentication information carried in the discovery start command.

In an embodiment, in a case that the discovery start command does not carry the discovery mode corresponding to the discovery process, the second terminal may determine the pre-configured default discovery mode as the discovery mode corresponding to the discovery process, to start the discovery process according to the determined discovery mode.

In an embodiment, after starting the discovery process, the second terminal may send a discovery start confirm message to the network device. The discovery start confirm message is used for indicating that the second terminal has started the discovery process. The discovery start confirm message may carry one or more of information, for example, the discovery mode corresponding to the discovery process, the discovery start time, the discovery duration, or the dedicated verification and authentication information.

After the discovery start confirm message sent by the second terminal is received, the network device generates the response message based on the discovery start confirm message, and sends the response message to the first terminal, to trigger the first terminal to start the discovery process. The response message may carry one or more of information, for example, the discovery mode corresponding to the discovery process, the discovery start time, the discovery duration, or the dedicated verification and authentication information.

In an embodiment, after starting the discovery process, the second terminal may not send the discovery start confirm message to the network device. In this case, after learning that the second terminal starts the discovery process, the network device may directly generate the response message, and send the response message to the first terminal, to trigger the first terminal to start the discovery process. The response message may carry one or more of information, for example, the discovery mode corresponding to the discovery process, the discovery start time, the discovery duration, or the dedicated verification and authentication information.

In an embodiment, when performing S310, the first terminal starts the discovery process according to information carried in the response message. Details are as follows.

In a case that the response message carries the discovery mode corresponding to the discovery process, the first terminal starts the discovery process according to the discovery mode carried in the response message.

In a case that the response message carries the discovery start time, the first terminal starts the discovery process according to the discovery start time carried in the response message.

In a case that the response message carries the discovery duration, the first terminal starts the discovery process and sustains the discovery process according to the discovery duration carried in the response message.

In a case that the response message carries the dedicated verification and authentication information, the first terminal starts the discovery process, and performs verification and authentication on the second terminal in the discovery process based on the dedicated verification and authentication information carried in the response message.

In an embodiment, subscription binding configuration information is pre-configured in the first terminal or a universal subscriber identity module (USIM) card of the first terminal.

In an embodiment, before sending the wake-up discovery request to the network device, the first terminal may receive the subscription binding configuration information configured and sent by the network device. In a case that the subscription binding configuration information is pre-configured in the first terminal or the USIM card of the first terminal, the subscription binding configuration information configured by the network device may be preferentially used.

In an embodiment, the subscription binding configuration information is pre-configured in the second terminal or a USIM card of the second terminal.

In an embodiment, before receiving the discovery start command sent by the network device, the second terminal may receive the subscription binding configuration information configured and sent by the network device. In a case that the subscription binding configuration information is pre-configured in the second terminal or the USIM card of the second terminal, the subscription binding configuration information configured by the network device may be preferentially used.

In the above embodiments, the subscription binding configuration information includes the identification information of the first terminal, the identification information of the second terminal, and the binding group identification information corresponding to the subscription binding relationship. In addition, the subscription binding configuration information may further include one or more of information, for example, the capability information of the first terminal, the capability information of the second terminal, the dedicated verification and authentication information, or the default configuration information.

In an embodiment, before sending the discovery start command to the second terminal, the network device may first determine that the second terminal is in a connected state. In a case of determining that the second terminal is in an idle state, the network device may send a first paging message carrying the discovery start command to the second terminal, where the first paging message is used for triggering the second terminal to switch from the current idle state to the connected state and starting the discovery process based on the discovery start command. Alternatively, the network device may first send a second paging message to the second terminal, where the second paging message is used for triggering the second terminal to switch from the current idle state to the connected state. Then, the network device sends the discovery start command to the second terminal.

In an embodiment, the wake-up discovery request carries the identification information of the first terminal and the identification information of the second terminal. Before sending the discovery start command to the second terminal, the network device may determine, according to the identification information of the first terminal and the identification information of the second terminal, whether there is the subscription binding relationship between the second terminal and the first terminal, and then send the discovery start command to the second terminal when determining that there is the subscription binding relationship between the second terminal and the first terminal, to ensure the accuracy of command sending.

The trigger discovery method provided in the present application is described in detail below through several embodiments.

Figure 4:
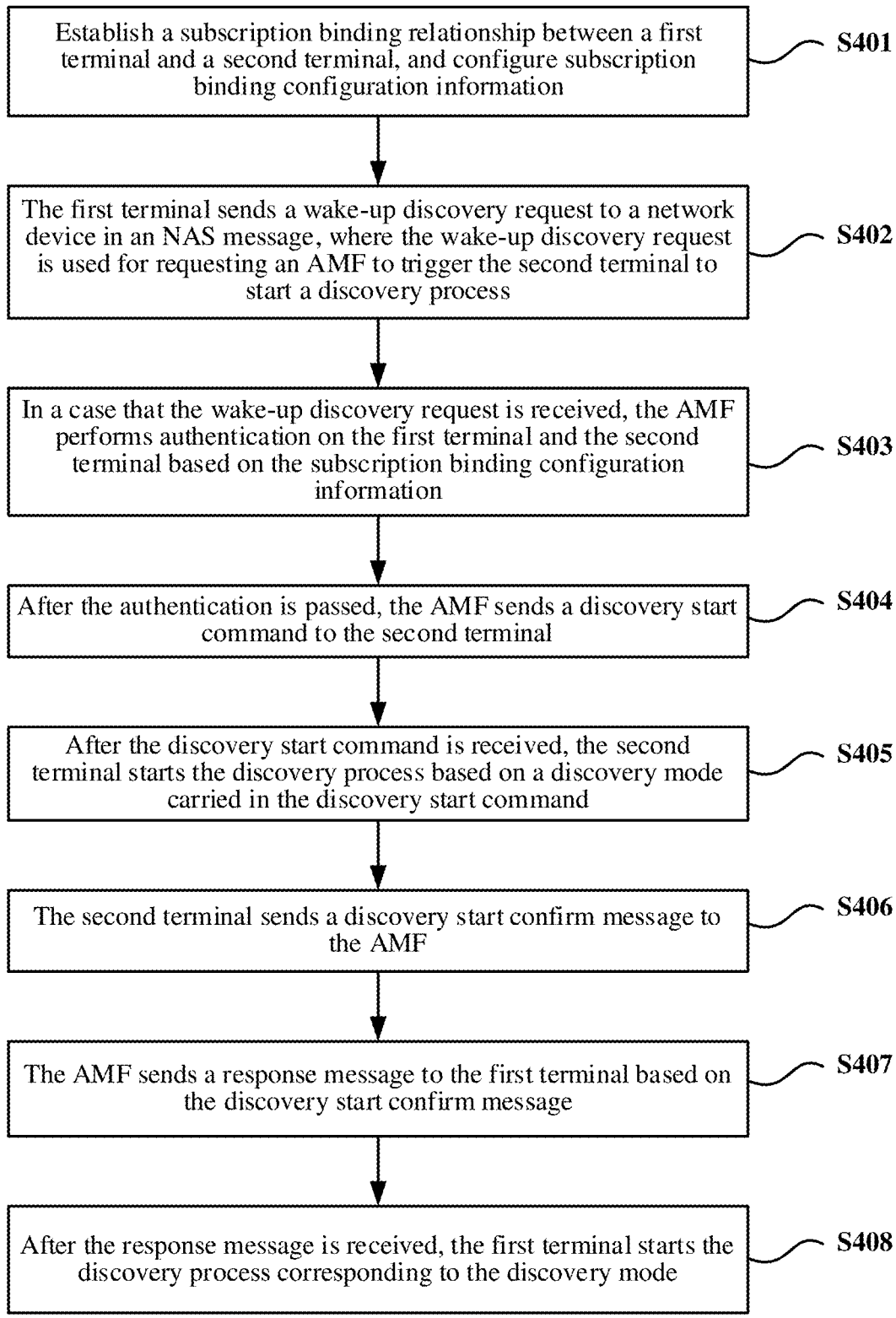
FIG. 4 is a schematic flowchart of a trigger discovery method according to another embodiment of the present application.

FIG. 4 is a schematic flowchart of a trigger discovery method according to an embodiment of the present application. The method in FIG. 4 is performed by a first terminal, a second terminal, and a network device. The first terminal requests the network device to trigger the second terminal to start a discovery process in a non-access stratum (NAS) message, and an AMF of the network device is responsible for starting the discovery process by the second terminal. In addition, in addition to the AMF, a PCF of the network device or another core-network network element may also be responsible for starting the discovery process by the second terminal (not shown in the flowchart of FIG. 4). In this embodiment, the second terminal is in a connected state. The method may include the following steps.

S401. Establish a subscription binding relationship between the first terminal and the second terminal, and configure subscription binding configuration information.

The subscription binding configuration information includes identification information of the first terminal, identification information of the second terminal, and binding group identification information corresponding to the subscription binding relationship. In addition to the above information, the subscription binding configuration information may further include one or more of information, for example, capability information of the first terminal (for example, whether the first terminal can be used as a relay), capability information of the second terminal (for example, whether the second terminal can be used as a relay), dedicated verification and authentication information, default configuration information (for example, configuration of a default discovery mode, or configuration used as a default relay terminal).

The subscription binding configuration information may be pre-configured in the first terminal and/or the second terminal, or may be configured by the network device and sent to the first terminal and/or the second terminal before the discovery is triggered. For example, before receiving the wake-up discovery request sent by the first terminal, the network device sends the pre-configured subscription binding configuration information to the first terminal. Alternatively, before sending a discovery start command to the second terminal, the network device sends the subscription binding configuration information to the second terminal.

S402. The first terminal sends a wake-up discovery request to the network device in the NAS message, where the wake-up discovery request is used for requesting the AMF to trigger the second terminal to start the discovery process.

The wake-up discovery request may carry one or more of information, for example, the identification information of the first terminal, the identification information of the second terminal, the binding group identification information corresponding to the subscription binding relationship, a discovery mode corresponding to the discovery process, a discovery start time, a discovery duration, or the dedicated verification and authentication information.

S403. In a case that the wake-up discovery request is received, the AMF performs authentication on the first terminal and the second terminal based on the subscription binding configuration information.

In this step, the authentication of the first terminal and the second terminal may include authenticating whether there is the subscription binding relationship between the first terminal and the second terminal.

S404. After the authentication is passed, the AMF sends the discovery start command to the second terminal.

In this embodiment, the discovery start command carries the discovery mode corresponding to the discovery process. In addition, the discovery start command may further carry one or more of information, for example, the discovery start time, the discovery duration, or the dedicated verification and authentication information.

When performing this step, the network device may send, according to the identification information of the second terminal carried in the wake-up discovery request, the discovery start command to the second terminal corresponding to the identification information.

In an embodiment, in a case that the wake-up discovery request does not carry the identification information of the second terminal, the network device may send the discovery start command to a terminal that has the subscription binding relationship with the first terminal. Optionally, the network device may determine, based on the identification information of the first terminal and/or the binding group identification information carried in the wake-up discovery request, the second terminal that has the subscription binding relationship with the first terminal, to send the discovery start command to the determined second terminal. Optionally, the network device may send the discovery start command to a default terminal device based on the subscription binding configuration information. For example, in a case that the subscription binding configuration information includes configuration of a default relay device, the network device may send the discovery start command to the default relay device.

In an embodiment, in a case that the authentication fails, the network device may refuse to send the discovery start command to the second terminal.

S405. After the discovery start command is received, the second terminal starts the discovery process based on the discovery mode carried in the discovery start command, namely, starts the discovery process corresponding to the discovery mode.

S406. The second terminal sends a discovery start confirm message to the AMF.

The discovery start confirm message is used for indicating that the second terminal has started the discovery process.

S407. The AMF sends a response message to the first terminal based on the discovery start confirm message.

The discovery start confirm message may carry one or more of information, for example, the discovery mode corresponding to the discovery process, the discovery start time, the discovery duration, or the dedicated verification and authentication information. The response message may carry one or more of information, for example, the discovery mode corresponding to the discovery process, the discovery start time, the discovery duration, or the dedicated verification and authentication information.

S408. After the response message is received, the first terminal starts the discovery process corresponding to the discovery mode.

In this embodiment, the discovery mode may be carried in one or more of the wake-up discovery request, the discovery start command, the discovery start confirm message, or the response message.

It can be seen from this embodiment that, a first terminal sends a wake-up discovery request to an AMF of a network device in an NAS message, to request the AMF to trigger a second terminal that has a subscription binding relationship with the first terminal to start a discovery process. The AMF sends a discovery start command to the second terminal based on the wake-up discovery request, and the second terminal starts the discovery process based on the sent discovery start command. Then, the AMF sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

Figure 5:
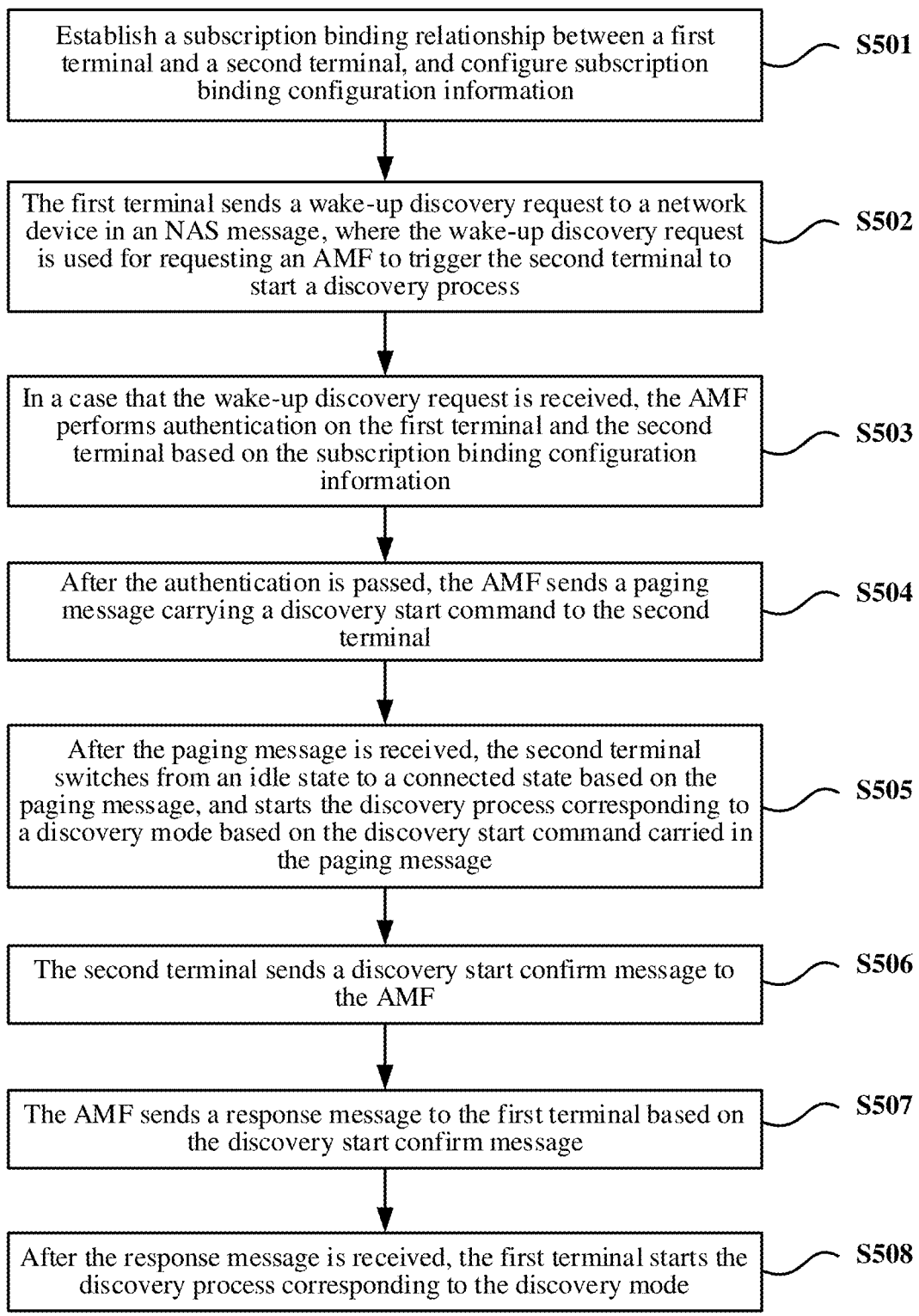
FIG. 5 is a schematic flowchart of a trigger discovery method according to still another embodiment of the present application.

FIG. 5 is a schematic flowchart of a trigger discovery method according to another embodiment of the present application. The method in FIG. 5 is performed by a first terminal, a second terminal, and a network device. The first terminal requests the network device to trigger the second terminal to start a discovery process in an NAS message, and an AMF of the network device is responsible for starting the discovery process by the second terminal. In addition, in addition to the AMF, a PCF of the network device or another core-network network element may also be responsible for starting the discovery process by the second terminal (not shown in the flowchart of FIG. 5). In this embodiment, the second terminal is in an idle state. The method may include the following steps.

S501. Establish a subscription binding relationship between the first terminal and the second terminal, and configure subscription binding configuration information.

The subscription binding configuration information has been described in the foregoing embodiments, and details are not repeated herein.

S502. The first terminal sends a wake-up discovery request to the network device in the NAS message, where the wake-up discovery request is used for requesting the AMF to trigger the second terminal to start the discovery process.

The wake-up discovery request may carry one or more of information, for example, the identification information of the first terminal, the identification information of the second terminal, the binding group identification information corresponding to the subscription binding relationship, a discovery mode corresponding to the discovery process, discovery start time, a discovery duration, or the dedicated verification and authentication information.

S503. In a case that the wake-up discovery request is received, the AMF performs authentication on the first terminal and the second terminal based on the subscription binding configuration information.

In this step, the authentication of the first terminal and the second terminal may include authenticating whether there is the subscription binding relationship between the first terminal and the second terminal.

S504. After the authentication is passed, the AMF sends a paging message carrying a discovery start command to the second terminal.

In this embodiment, the discovery start command carries the discovery mode corresponding to the discovery process.

In addition, the discovery start command may further carry one or more of information, for example, the discovery start time, the discovery duration, or the dedicated verification and authentication information. The discovery mode carried in the discovery start command may be the discovery mode carried in the wake-up discovery request, and may also be determined by the network device. The network device may determine a default discovery mode configured in the subscription binding configuration information as the discovery mode corresponding to the discovery process, and add the discovery mode to the discovery start command.

In an embodiment, in a case that the authentication fails, the network device may refuse to send the discovery start command to the second terminal.

S505. After the paging message is received, the second terminal switches from the idle state to a connected state based on the paging message, and starts the discovery process corresponding to the discovery mode based on the discovery start command carried in the paging message.

In an embodiment, in a case that the discovery start command does not carry the discovery mode, the second terminal may determine the default discovery mode configured in the subscription binding configuration information as the discovery mode corresponding to the discovery process.

S506. The second terminal sends a discovery start confirm message to the AMF.

The discovery start confirm message is used for indicating that the second terminal has started the discovery process.

S507. The AMF sends a response message to the first terminal based on the discovery start confirm message.

The discovery start confirm message may carry one or more of information, for example, the discovery mode corresponding to the discovery process, the discovery start time, the discovery duration, or the dedicated verification and authentication information. The response message may carry one or more of information, for example, the discovery mode corresponding to the discovery process, the discovery start time, the discovery duration, or the dedicated verification and authentication information.

S508. After the response message is received, the first terminal starts the discovery process corresponding to the discovery mode.

In this embodiment, the discovery mode may be carried in one or more of the wake-up discovery request, the discovery start command, the discovery start confirm message, or the response message.

It can be seen from this embodiment that, a first terminal sends a wake-up discovery request to an AMF of a network device in an NAS message, to request the AMF to trigger a second terminal that has a subscription binding relationship with the first terminal to start a discovery process. The AMF sends a paging message carrying a discovery start command to the second terminal based on the wake-up discovery request, and the second terminal switches to a connected state and starts the discovery process based on the paging message. Then, the AMF sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

Figure 6:
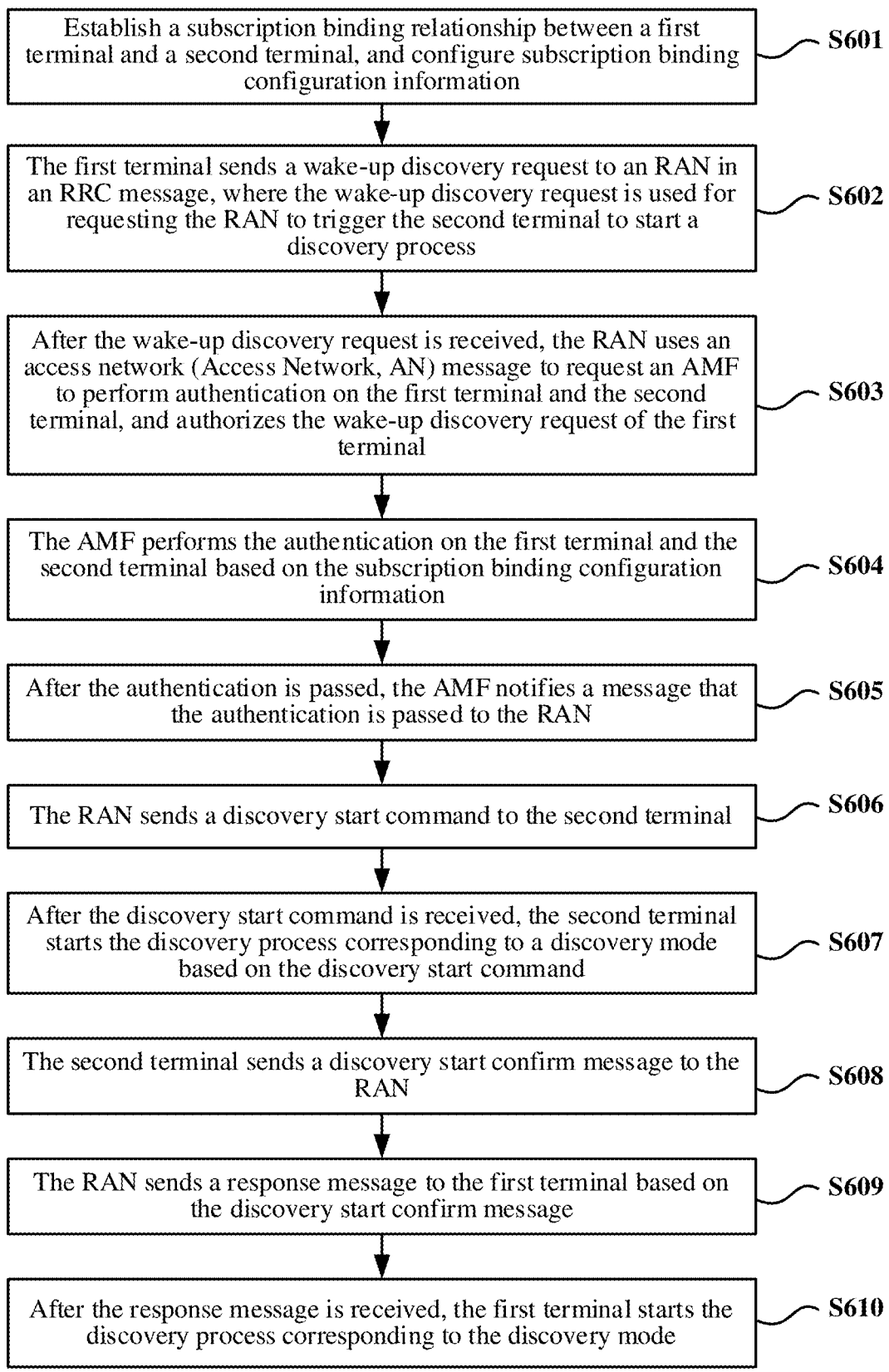
FIG. 6 is a schematic flowchart of a trigger discovery method according to still another embodiment of the present application.

FIG. 6 is a schematic flowchart of a trigger discovery method according to still another embodiment of the present application. The method in FIG. 6 is performed by a first terminal, a second terminal, and a network device. The first terminal requests the network device to trigger the second terminal to start a discovery process in a radio resource control (RRC) message, and a radio access network (RAN) of the network device is responsible for starting the discovery process by the second terminal. The method may include the following steps.

S601. Establish a subscription binding relationship between the first terminal and the second terminal, and configure subscription binding configuration information.

The subscription binding configuration information has been described in the foregoing embodiments, and details are not repeated herein.

S602. The first terminal sends a wake-up discovery request to the RAN in the RRC message, where the wake-up discovery request is used for requesting the RAN to trigger the second terminal to start the discovery process.

The wake-up discovery request may carry one or more of information, for example, the identification information of the first terminal, the identification information of the second terminal, the binding group identification information corresponding to the subscription binding relationship, a discovery mode corresponding to the discovery process, discovery start time, a discovery duration, or the dedicated verification and authentication information.

S603. After the wake-up discovery request is received, the RAN uses an access network (AN) message to request an AMF to perform authentication on the first terminal and the second terminal, and authorizes the wake-up discovery request of the first terminal.

S604. The AMF performs authentication on the first terminal and the second terminal based on the subscription binding configuration information.

In this step, the authentication of the first terminal and the second terminal may include authenticating whether there is the subscription binding relationship between the first terminal and the second terminal.

S605. After the authentication is passed, the AMF notifies a message that the authentication is passed to the RAN.

S606. The RAN sends a discovery start command to the second terminal.

In this embodiment, the discovery start command carries the discovery mode corresponding to the discovery process. In addition, the discovery start command may further carry one or more of information, for example, the discovery start time, the discovery duration, or the dedicated verification and authentication information. The discovery mode carried in the discovery start command may be the discovery mode carried in the wake-up discovery request, and may also be determined by the network device. The network device may determine a default discovery mode configured in the subscription binding configuration information as the discovery mode corresponding to the discovery process, and add the discovery mode to the discovery start command.

In an embodiment, in a case that the authentication fails, the network device may refuse to send the discovery start command to the second terminal.

S607. After the discovery start command is received, the second terminal starts the discovery process corresponding to the discovery mode based on the discovery start command.

In an embodiment, in a case that the discovery start command does not carry the discovery mode, the second terminal may determine the default discovery mode configured in the subscription binding configuration information as the discovery mode corresponding to the discovery process.

S608. The second terminal sends a discovery start confirm message to the RAN.

The discovery start confirm message is used for indicating that the second terminal has started the discovery process.

S609. The RAN sends a response message to the first terminal based on the discovery start confirm message.

The discovery start confirm message may carry one or more of information, for example, the discovery mode corresponding to the discovery process, the discovery start time, the discovery duration, or the dedicated verification and authentication information. The response message may carry one or more of information, for example, the discovery mode corresponding to the discovery process, the discovery start time, the discovery duration, or the dedicated verification and authentication information.

S610. After the response message is received, the first terminal starts the discovery process corresponding to the discovery mode.

In this embodiment, the discovery mode may be carried in one or more of the wake-up discovery request, the discovery start command, the discovery start confirm message, or the response message.

It can be seen from this embodiment that, a first terminal sends a wake-up discovery request to a RAN of a network device in an RRC message, to request the RAN to trigger a second terminal that has a subscription binding relationship with the first terminal to start a discovery process. After the AMF passes authentication on the first terminal and the second terminal, the RAN sends a discovery start command to the second terminal, and the second terminal starts the discovery process based on the sent discovery start command. Then, the RAN sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

Specific embodiments of this specification are described above. Other embodiments fall within the scope of the appended claims. In some cases, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

Figure 7:
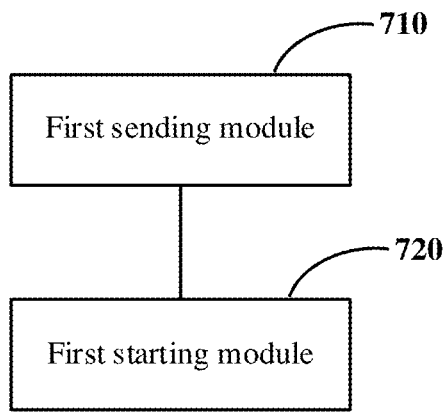
FIG. 7 is a schematic structural diagram of a terminal device according to an embodiment of the present application.

FIG. 7 is a schematic structural diagram of a terminal device according to an embodiment of the present application. Referring to FIG. 7, the terminal device may include:
a first sending module 710, configured to send a wake-up discovery request to a network device, where the wake-up discovery request is used for requesting the network device to trigger a second terminal to start a discovery process, and there is a subscription binding relationship between the second terminal and the first terminal; and
a first starting module 720, configured to start the discovery process in a case that a response message sent by the network device is received, where the response message is used for indicating that the second terminal has started the discovery process.

In an embodiment, the wake-up discovery request carries at least one of identification information of the first terminal, identification information of the second terminal, binding group identification information corresponding to the subscription binding relationship, a discovery mode corresponding to the discovery process, discovery start time, a discovery duration, or dedicated verification and authentication information.

In an embodiment, the response message carries at least one of the discovery mode corresponding to the discovery process, the discovery start time, the discovery duration, or the dedicated verification and authentication information.

The first starting module 720 is further configured to:
start the discovery process according to the discovery mode in a case that the response message carries the discovery mode;
start the discovery process according to the discovery start time in a case that the response message carries the discovery start time;
start, in a case that the response message carries the discovery duration, the discovery process, and sustain the discovery process according to the discovery duration; and
start, in a case that the response message carries the dedicated verification and authentication information, the discovery process, and perform verification and authentication on the second terminal in the discovery process based on the dedicated verification and authentication information.

In an embodiment, subscription binding configuration information is pre-configured in the first terminal or a universal subscriber identity module USIM card of the first terminal. The subscription binding configuration information includes the identification information of the first terminal, the identification information of the second terminal, and the binding group identification information corresponding to the subscription binding relationship.

In an embodiment, the subscription binding configuration information further includes at least one of the following: capability information of the first terminal, capability information of the second terminal, the dedicated verification and authentication information, or default configuration information.

In an embodiment, the terminal device further includes:
a first receiving module, configured to receive, before sending the wake-up discovery request to the network device, the subscription binding configuration information configured and sent by the network device.

The terminal device provided in the embodiments of the present application can implement various processes implemented by the terminal device in the foregoing method embodiments. To avoid repetition, details are not described herein again.

In the embodiments of the present application, a first terminal sends a wake-up discovery request to a network device, to request the network device to trigger a second terminal that has a subscription binding relationship with the first terminal to start a discovery process. The network device sends a discovery start command to the second terminal based on the wake-up discovery request, and the second terminal starts the discovery process based on the sent discovery start command. Then, the network device sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

Figure 8:
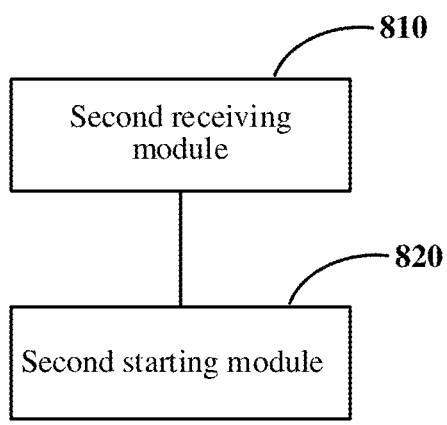
FIG. 8 is a schematic structural diagram of a terminal device according to another embodiment of the present application.

FIG. 8 is a schematic structural diagram of a terminal device according to another embodiment of the present application. Referring to FIG. 8, the terminal device may include:
a second receiving module 810, configured to receive a discovery start command sent by a network device, where the discovery start command is generated by the network device based on a wake-up discovery request sent by a first terminal, and there is a subscription binding relationship between the second terminal and the first terminal; and
a second starting module 820, configured to start a discovery process based on the discovery start command.

In an embodiment, the wake-up discovery request carries at least one of identification information of the first terminal, identification information of the second terminal, binding group identification information corresponding to the subscription binding relationship, a discovery mode corresponding to the discovery process, discovery start time, a discovery duration, or dedicated verification and authentication information.

In an embodiment, the discovery start command carries at least one of the discovery mode corresponding to the discovery process, the discovery start time, the discovery duration, or the dedicated verification and authentication information.

The second starting module 820 is further configured to:
start the discovery process according to the discovery mode in a case that the discovery start command carries the discovery mode;
start the discovery process according to the discovery start time in a case that the discovery start command carries the discovery start time;
start, in a case that the discovery start command carries the discovery duration, the discovery process, and sustain the discovery process according to the discovery duration; and
start, in a case that the discovery start command carries the dedicated verification and authentication information, the discovery process, and perform verification and authentication on the first terminal in the discovery process based on the dedicated verification and authentication information.

In an embodiment, the terminal device further includes:
a first determining module, configured to determine a pre-configured default discovery mode as the discovery mode in a case that the discovery start command does not carry the discovery mode.

In an embodiment, the terminal device further includes:
a first sending module, configured to send, after the starting a discovery process, a discovery start confirm message to the network device. The discovery start confirm message is used for indicating that the second terminal has started the discovery process. The discovery start confirm message carries at least one of the discovery mode corresponding to the discovery process, the discovery start time, the discovery duration, or the dedicated verification and authentication information.

In an embodiment, subscription binding configuration information is pre-configured in the second terminal or a universal subscriber identity module USIM card of the second terminal. The subscription binding configuration information includes identification information of the first terminal, identification information of the second terminal, and binding group identification information corresponding to the subscription binding relationship.

In an embodiment, the subscription binding configuration information further includes at least one of the following: capability information of the first terminal, capability information of the second terminal, the dedicated verification and authentication information, or default configuration information.

In an embodiment, the terminal device further includes:
a third receiving module, configured to receive, before receiving the discovery start command sent by the network device, the subscription binding configuration information configured and sent by the network device.

The terminal device provided in the embodiments of the present application can implement various processes implemented by the terminal device in the foregoing method embodiments. To avoid repetition, details are not described herein again.

In the embodiments of the present application, a first terminal sends a wake-up discovery request to a network device, to request the network device to trigger a second terminal that has a subscription binding relationship with the first terminal to start a discovery process. The network device sends a discovery start command to the second terminal based on the wake-up discovery request, and the second terminal starts the discovery process based on the sent discovery start command. Then, the network device sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

Figure 9:
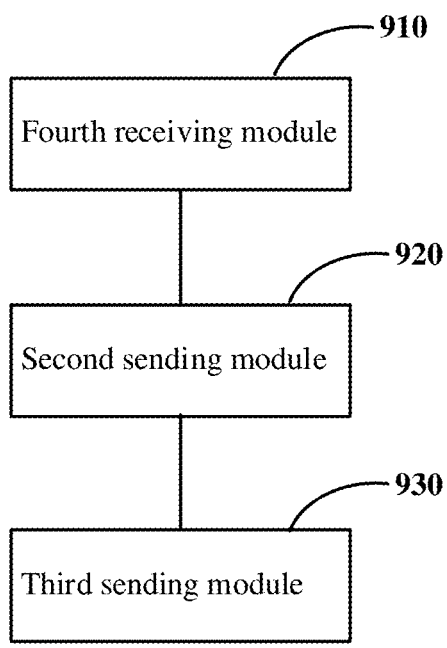
FIG. 9 is a schematic structural diagram of a network device according to an embodiment of the present application.

FIG. 9 is a schematic structural diagram of a network device according to another embodiment of the present application; Referring to FIG. 9, the network device may include:
a fourth receiving module 910, configured to receive a wake-up discovery request sent by a first terminal, where the wake-up discovery request is used for requesting the network device to trigger a second terminal to start a discovery process, and there is a subscription binding relationship between the second terminal and the first terminal; and
a second sending module 920, configured to send a discovery start command to the second terminal based on the wake-up discovery request; and
a third sending module 930, configured to send a response message to the first terminal after the second terminal starts the discovery process based on the discovery start command, where the response message is used for indicating that the second terminal has started the discovery process.

In an embodiment, the wake-up discovery request carries at least one of identification information of the first terminal, identification information of the second terminal, binding group identification information corresponding to the subscription binding relationship, a discovery mode corresponding to the discovery process, discovery start time, a discovery duration, or dedicated verification and authentication information.

In an embodiment, the second sending module 920 is further configured to:

send the discovery start command to the second terminal corresponding to the identification information in a case that the wake-up discovery request carries the identification information of the second terminal.

In an embodiment, the second sending module 920 is further configured to:
send, in a case that the wake-up discovery request does not carry the identification information of the second terminal, the discovery start command to a terminal that has the subscription binding relationship with the first terminal.

In an embodiment, the network device further includes:
a second determining module, configured to determine, before sending the discovery start command to the second terminal, a pre-configured default discovery mode as the discovery mode corresponding to the discovery process in a case that the wake-up discovery request does not carry the discovery mode corresponding to the discovery process.

The third sending module 930 is further configured to send the discovery start command carrying the determined discovery mode to the second terminal.

In an embodiment, the discovery start command carries at least one of the discovery mode corresponding to the discovery process, the discovery start time, the discovery duration, or the dedicated verification and authentication information.

In an embodiment, the network device further includes:
a fifth receiving module, configured to receive, before the sending the response message to the first terminal, the discovery start confirm message sent by the second terminal.

In an embodiment, the discovery start confirm message carries at least one of the discovery mode corresponding to the discovery process, the discovery start time, the discovery duration, or the dedicated verification and authentication information.

In an embodiment, the second sending module 920 is further configured to:
send a first paging message carrying the discovery start command to the second terminal in a case that the second terminal is in an idle state, where the first paging message is used for triggering the second terminal to switch from the current idle state to a connected state and starting the discovery process based on the discovery start command.

In an embodiment, the network device further includes:
a fourth sending module, configured to send, before sending the discovery start command to the second terminal, a second paging message to the second terminal in a case that the second terminal is in an idle state, where the second paging message is used for triggering the second terminal to switch from the current idle state to a connected state.

In an embodiment, the network device further includes:
a third determining module, configured to determine, according to the identification information of the first terminal and the identification information of the second terminal before sending the discovery start command to the second terminal and in a case that the wake-up discovery request carries the identification information of the first terminal and the identification information of the second terminal, that there is the subscription binding relationship between the second terminal and the first terminal.

In an embodiment, the network device further includes:

a fifth sending module, configured to: send, before receiving the wake-up discovery request sent by the first terminal, pre-configured subscription binding configuration information to the first terminal; and send, before sending the discovery start command to the second terminal, the subscription binding configuration information to the second terminal.

The subscription binding configuration information includes identification information of the first terminal, identification information of the second terminal, and binding group identification information corresponding to the subscription binding relationship.

In an embodiment, the subscription binding configuration information further includes at least one of the following: capability information of the first terminal, capability information of the second terminal, the dedicated verification and authentication information, or default configuration information.

The network device provided in the embodiments of the present application can implement various processes implemented by the network device in the foregoing method embodiments. To avoid repetition, details are not described herein again.

In the embodiments of the present application, a first terminal sends a wake-up discovery request to a network device, to request the network device to trigger a second terminal that has a subscription binding relationship with the first terminal to start a discovery process. The network device sends a discovery start command to the second terminal based on the wake-up discovery request, and the second terminal starts the discovery process based on the sent discovery start command. Then, the network device sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

Figure 10:
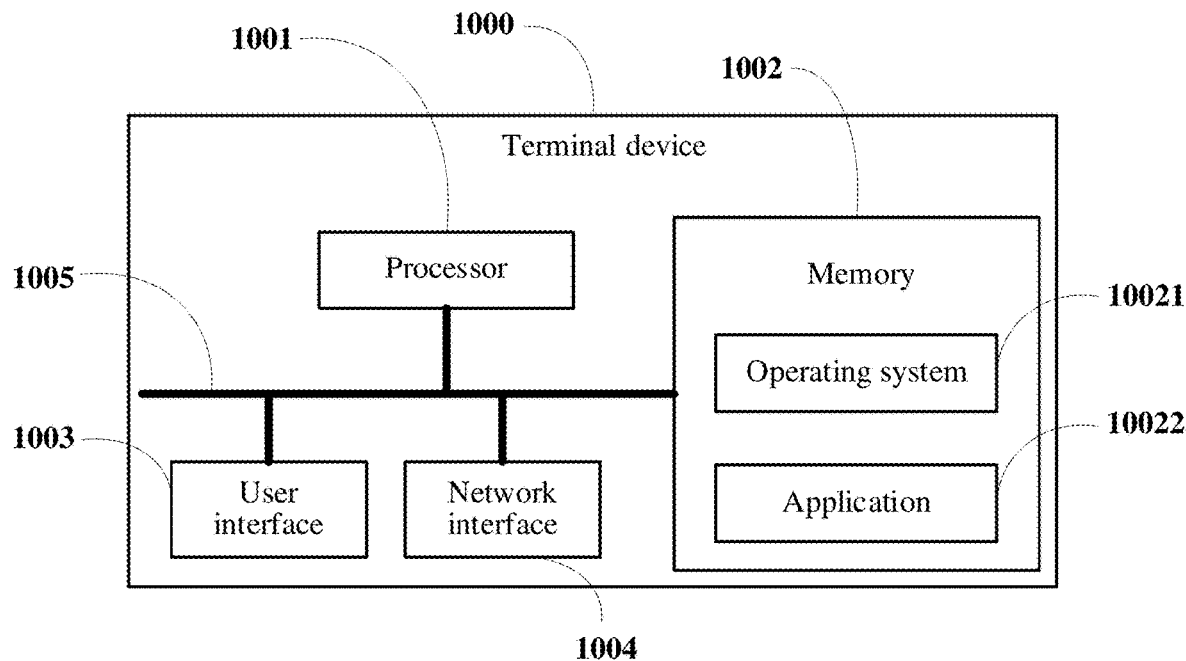
FIG. 10 is a schematic structural diagram of a terminal device according to still another embodiment of the present application.

FIG. 10 is a schematic structural diagram of a terminal device according to another embodiment of the present application. A terminal device 1000 shown in FIG. 10 includes at least one processor 1001, a memory 1002, at least one network interface 1004, and a user interface 1003. All the components in the terminal device 1000 are coupled together by a bus system 1005. It may be understood that the bus system 1005 is configured to implement connection and communication between the components. In addition to a data bus, the bus system 1005 further includes a power bus, a control bus, and a status signal bus. However, for ease of clear description, all types of buses are marked as the bus system 1005 in FIG. 10.

The user interface 1003 may include a display, a keyboard or a clicking device (for example, a mouse), a trackball, a touch panel or a touchscreen, and the like.

It may be understood that the memory 1002 in the embodiments of the present application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory 1002 in the system and method described in the embodiments of the present application is intended to include, but is not limited to, the memories and any other memory of a suitable type.

In some implementations, the memory 1002 stores the following element, executable module, or data structure, or a subset thereof, or an extension set thereof: an operating system 10021 and an application 10022.

The operating system 10021 includes various system programs, for example, a framework layer, a core library layer, and a driver layer, which are used for implementing various basic services and processing a task based on hardware. The application 10022 may include various applications, for example, a media player and a browser, used for implementing various application services. A program for implementing the method in the embodiments of the present application may be included in the application 10022.

In this embodiment of the present application, the terminal device 1000 further includes: a computer program stored in the memory 1009 and executable by the processor 1001, the computer program, when executed by the processor 1001, implementing the following steps:

sending a wake-up discovery request to a network device, where the wake-up discovery request is used for requesting the network device to trigger a second terminal to start a discovery process, and there is a subscription binding relationship between the second terminal and a first terminal; and starting the discovery process in a case that a response message sent by the network device is received, where the response message is used for indicating that the second terminal has started the discovery process.

The method disclosed in the foregoing embodiment of the present application may be applied to the processor 1001, or implemented by the processor 1001. The processor 1001 may be an integrated circuit chip having a signal processing capability. In an implementation process, steps in the foregoing methods can be implemented by using a hardware integrated logical circuit in the processor 1001, or by using instructions in a form of software. The foregoing processor 1001 may be a general purpose processor, a digital signal processor (DSP), an application-specific integrated circuit (ASIC), a field-programmable gate array (FPGA), or another programmable logic device, discrete gate or transistor logic device, or discrete hardware component. Disclosed methods, steps, and logic block diagrams in the embodiments of the present application may be implemented or performed. The general-purpose processor may be a microprocessor, or the processor may be any conventional processor or the like. The steps in the methods disclosed in the embodiments of the present application may be directly implemented by a hardware decoding processor, or may be implemented by combining hardware and software modules in a decoding processor. The software module may be stored in a computer-readable storage medium that is mature in the art, for example, a random access memory, a flash memory, a read-only memory, a programmable read-only memory, an electrically erasable programmable memory, or a register. The computer-readable storage medium is located in the memory 1002, and the processor 1001 reads information in the memory 1002, and completes the steps in the foregoing methods in combination with hardware thereof. Optionally, the computer-readable storage medium stores a computer program. The computer program, when being executed by the processor 1001, implements, for example, the steps of the above embodiments of the trigger discovery method.

It may be understood that, the embodiments described in the embodiments of the present application may be implemented by using software, hardware, firmware, middleware, microcode, or a combination thereof. For hardware implementation, a processing unit may be implemented in one or more application-specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to perform the functions described in the present application, or a combination of the above.

For implementation by software, the technologies in the embodiments of the present application may be implemented by performing the functional modules (for example, a process and a function) in the embodiments of the present application. Software code may be stored in a memory and executed by a processor. The memory may be implemented in the processor or outside the processor.

Optionally, the wake-up discovery request carries at least one of identification information of the first terminal, identification information of the second terminal, binding group identification information corresponding to the subscription binding relationship, a discovery mode corresponding to the discovery process, discovery start time, a discovery duration, or dedicated verification and authentication information.

Optionally, the response message carries at least one of a discovery mode corresponding to the discovery process, discovery start time, a discovery duration, or dedicated verification and authentication information; and the computer program, when executed by the processor 1001, may further implement the following steps:

starting the discovery process according to the discovery mode in a case that the response message carries the discovery mode;

starting the discovery process according to the discovery start time in a case that the response message carries the discovery start time;

starting, in a case that the response message carries the discovery duration, the discovery process, and sustaining the discovery process according to the discovery duration; and starting, in a case that the response message carries the dedicated verification and authentication information, the discovery process, and performing verification and authentication on the second terminal in the discovery process based on the dedicated verification and authentication information.

Optionally, subscription binding configuration information is pre-configured in the first terminal or a universal subscriber identity module USIM card of the first terminal; and the subscription binding configuration information includes the identification information of the first terminal, the identification information of the second terminal, and the binding group identification information corresponding to the subscription binding relationship.

Optionally, the subscription binding configuration information further includes at least one of the following: capability information of the first terminal, capability information of the second terminal, the dedicated verification and authentication information, or default configuration information.

Optionally, the computer program, when executed by the processor 1001, may further implement the following step:

receiving, before the sending a wake-up discovery request to a network device, the subscription binding configuration information configured and sent by the network device.

The terminal device 1000 can implement various processes and effects implemented by the terminal device in the foregoing embodiments. To avoid repetition, details are not described herein again.

In the embodiments of the present application, a first terminal sends a wake-up discovery request to a network device, to request the network device to trigger a second terminal that has a subscription binding relationship with the first terminal to start a discovery process. The network device sends a discovery start command to the second terminal based on the wake-up discovery request, and the second terminal starts the discovery process based on the sent discovery start command. Then, the network device sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

Figure 11:
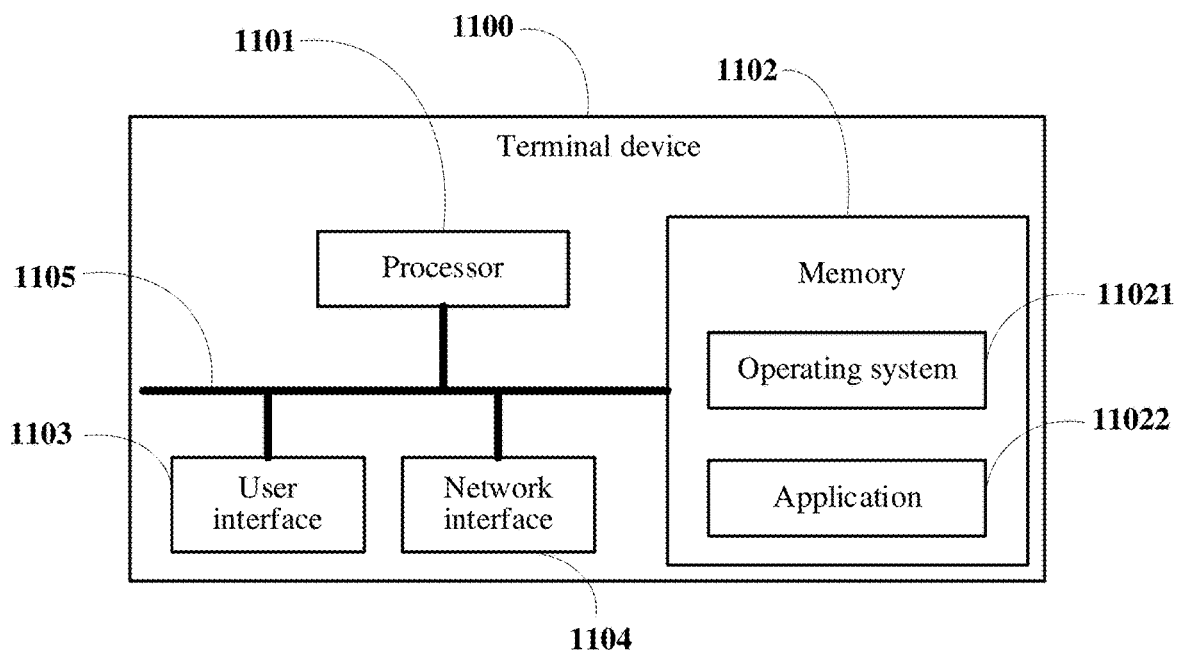
FIG. 11 is a schematic structural diagram of a terminal device according to still another embodiment of the present application.

FIG. 11 is a schematic structural diagram of a terminal device according to still another embodiment of the present application. A terminal device 1100 shown in FIG. 11 includes at least one processor 1101, a memory 1102, at least one network interface 1104, and a user interface 1103. All the components in the terminal device 1100 are coupled together by a bus system 1105. It may be understood that the bus system 1105 is configured to implement connection and communication between the components. In addition to a data bus, the bus system 1105 further includes a power bus, a control bus, and a status signal bus. However, for ease of clear description, all types of buses are marked as the bus system 1105 in FIG. 11.

The user interface 1103 may include a display, a keyboard or a clicking device (for example, a mouse), a trackball, a touch panel or a touchscreen, and the like.

It may be understood that the memory 1102 in the embodiments of the present application may be a volatile memory or a nonvolatile memory, or may include a volatile memory and a nonvolatile memory. The non-volatile memory may be a ROM, a PROM, an EPROM, an EEPROM, or a flash memory. The volatile memory may be a RAM, and is used as an external cache. Many forms of RAMs, for example, an SRAM, a DRAM, an SDRAM, a DDRSDRAM, an ESDRAM, an SLDRAM, and a DR RAM can be used. This is used only as an example, but is not intended for limitative descriptions. The memory 1102 in the system and method described in the embodiments of the present application is intended to include, but is not limited to, the memories and any other memory of a suitable type.

In some implementations, the memory 1102 stores the following element, executable module, or data structure, or a subset thereof, or an extension set thereof: an operating system 11021 and an application 11022.

The operating system 11021 includes various system programs, for example, a framework layer, a core library layer, and a driver layer, which are used for implementing various basic services and processing a task based on hardware. The application 11022 may include various applications, for example, a media player and a browser, used for implementing various application services. A program for implementing the method in the embodiments of the present application may be included in the application 11022.

In this embodiment of the present application, the terminal device 1100 further includes: a computer program stored in the memory 1109 and executable by the processor 1101, the computer program, when executed by the processor 1101, implementing the following steps:

receiving a discovery start command sent by a network device, where the discovery start command is generated by the network device based on a wake-up discovery request sent by a first terminal, and there is a subscription binding relationship between a second terminal and the first terminal;

starting a discovery process based on the discovery start command.

The method disclosed in the foregoing embodiment of the present application may be applied to the processor 1101, or implemented by the processor 1101. The processor 1101 may be an integrated circuit chip having a signal processing capability. In an implementation process, steps in the foregoing methods can be implemented by using a hardware integrated logical circuit in the processor 1101, or by using instructions in a form of software. The above processor 1101 may be a general-purpose processor, a DSP, an ASIC, an FPGA, another programmable logical device, a discrete gate or transistor logic device, or a discrete hardware component. Disclosed methods, steps, and logic block diagrams in the embodiments of the present application may be implemented or performed. The general-purpose processor may be a microprocessor, or the processor may be any conventional processor or the like. The steps in the methods disclosed in the embodiments of the present application may be directly implemented by a hardware decoding processor, or may be implemented by combining hardware and software modules in a decoding processor. The software module may be stored in a computer-readable storage medium that is mature in the art, for example, a random access memory, a flash memory, a read-only memory, a programmable read-only memory, an electrically erasable programmable memory, or a register. The computer-readable storage medium is located in the memory 1102, and the processor 1101 reads information in the memory 1102, and completes the steps in the foregoing methods in combination with hardware thereof. Optionally, the computer-readable storage medium stores a computer program. The computer program, when being executed by the processor 1101, implements, for example, the steps of the above embodiments of the trigger discovery method.

It may be understood that, the embodiments described in the embodiments of the present application may be implemented by using software, hardware, firmware, middleware, microcode, or a combination thereof. For hardware implementation, a processing unit may be implemented in one or more ASICs, a DSP, a DSPD, a PLD, an FPGA, a general purpose processor, a controller, a micro-controller, a microprocessor, and other electronic units configured to perform the functions described in the present application, or a combination of the above.

For implementation by software, the technologies in the embodiments of the present application may be implemented by performing the functional modules (for example, a process and a function) in the embodiments of the present application. Software code may be stored in a memory and executed by a processor. The memory may be implemented in the processor or outside the processor.

Optionally, the wake-up discovery request carries at least one of identification information of the first terminal, identification information of the second terminal, binding group identification information corresponding to the subscription binding relationship, a discovery mode corresponding to the discovery process, discovery start time, a discovery duration, or dedicated verification and authentication information.

Optionally, the discovery start command carries at least one of the discovery mode corresponding to the discovery process, the discovery start time, the discovery duration, or the dedicated verification and authentication information; and the computer program, when executed by the processor 1101, may further implement the following steps:

starting the discovery process according to the discovery mode in a case that the discovery start command carries the discovery mode;

starting the discovery process according to the discovery start time in a case that the discovery start command carries the discovery start time;

starting, in a case that the discovery start command carries the discovery duration, the discovery process, and sustaining the discovery process according to the discovery duration; and starting, in a case that the discovery start command carries the dedicated verification and authentication information, the discovery process, and performing verification and authentication on the first terminal in the discovery process based on the dedicated verification and authentication information.

Optionally, the discovery start command carries at least one of the discovery mode corresponding to the discovery process, the discovery start time, the discovery duration, or the dedicated verification and authentication information; and the computer program, when executed by the processor 1101, may further implement the following step:

determining, before the starting a discovery process, a pre-configured default discovery mode as the discovery mode in a case that the discovery start command does not carry the discovery mode.

Optionally, the computer program, when executed by the processor 1101, may further implement the following step:

sending, after the starting a discovery process, a discovery start confirm message to the network device, where the discovery start confirm message is used for indicating that the second terminal has started the discovery process, and the discovery start confirm message carries at least one of the discovery mode corresponding to the discovery process, the discovery start time, the discovery duration, or the dedicated verification and authentication information.

Optionally, subscription binding configuration information is pre-configured in the second terminal or a universal subscriber identity module USIM card of the second terminal; and the subscription binding configuration information includes the identification information of the first terminal, the identification information of the second terminal, and the binding group identification information corresponding to the subscription binding relationship.

Optionally, the subscription binding configuration information further includes at least one of the following: capability information of the first terminal, capability information of the second terminal, the dedicated verification and authentication information, or default configuration information.

Optionally, the computer program, when executed by the processor 1101, may further implement the following step:
receiving, before the receiving a discovery start command sent by a network device, the subscription binding configuration information configured and sent by the network device.

The terminal device 1100 can implement various processes and effects implemented by the terminal device in the foregoing embodiments. To avoid repetition, details are not described herein again.

In the embodiments of the present application, a first terminal sends a wake-up discovery request to a network device, to request the network device to trigger a second terminal that has a subscription binding relationship with the first terminal to start a discovery process. The network device sends a discovery start command to the second terminal based on the wake-up discovery request, and the second terminal starts the discovery process based on the sent discovery start command. Then, the network device sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

Figure 12:
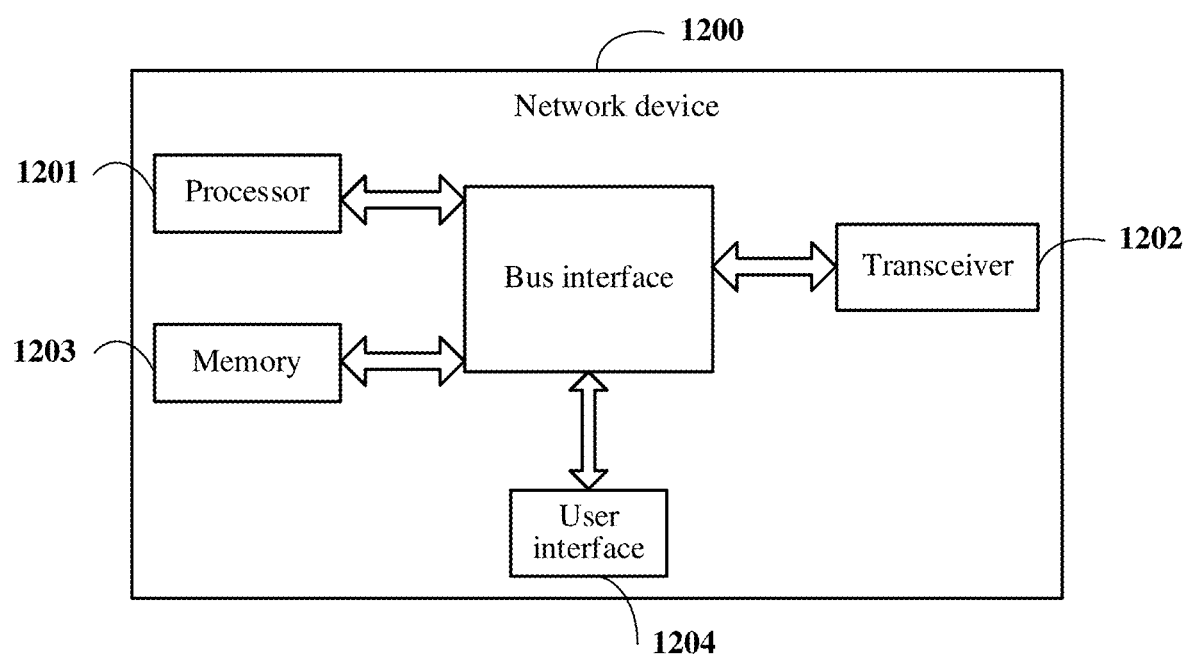
FIG. 12 is a schematic structural diagram of a network device according to another embodiment of the present application.

FIG. 12 is a structural diagram of a network device to which the embodiment of the present application is applied, and can implement details of the trigger discovery method performed by the network device in the foregoing embodiments and achieve the same effects. As shown in FIG. 12, a network device 1200 includes a processor 1201, a transceiver 1202, a memory 1203, a user interface 1204, and a bus system.

In this embodiment of the present application, the network device 1200 further includes: a computer program stored in the memory 1203 and executable by the processor 1201, the computer program, when executed by the processor 1201, implementing the following steps:
receiving a wake-up discovery request sent by a first terminal, where the wake-up discovery request is used for requesting the network device to trigger a second terminal to start a discovery process, and there is a subscription binding relationship between the second terminal and the first terminal; and
sending a discovery start command to the second terminal based on the wake-up discovery request; and
sending a response message to the first terminal after the second terminal starts the discovery process based on the discovery start command, where the response message is used for indicating that the second terminal has started the discovery process.

In FIG. 12, a bus architecture may include any quantity of interconnected buses and bridges, and connects various circuits that are of one or more processors represented by the processor 1201 and of a memory represented by the memory 1203. The bus architecture may further connect various other circuits for example, a peripheral device, a voltage stabilizer, and a power management circuit. These are known in the art, and therefore are not further described in this specification. The bus interface provides an interface. The transceiver 1202 may be a plurality of components, including a transmitter and a receiver, and providing units for communicating with various other apparatuses on a transmission medium. For different user devices, the user interface 1204 may be alternatively an interface capable of externally or internally connecting a required device, the connected device includes, but not limited to, a keypad, a display, a speaker, a microphone, and a joystick.

The processor 1201 is responsible for the management of the bus architecture and normal processing, and the memory 1203 may store data used when the processor 1201 performs an operation.

In the embodiments of the present application, a first terminal sends a wake-up discovery request to a network device, to request the network device to trigger a second terminal that has a subscription binding relationship with the first terminal to start a discovery process. The network device sends a discovery start command to the second terminal based on the wake-up discovery request, and the second terminal starts the discovery process based on the sent discovery start command. Then, the network device sends a response message used for indicating that the second terminal has started the discovery process to the first terminal, to trigger the first terminal to start the discovery process. It can be seen that, the technical solution enables terminals with a subscription binding relationship to start a discovery process under the trigger of one of the terminals instead of blind and continuous discovery, thereby greatly reducing the energy consumption of the terminals.

Optionally, the wake-up discovery request carries at least one of identification information of the first terminal, identification information of the second terminal, binding group identification information corresponding to the subscription binding relationship, a discovery mode corresponding to the discovery process, discovery start time, a discovery duration, or dedicated verification and authentication information.

Optionally, the computer program, when executed by the processor 1201, may further implement the following step:
sending, in a case that the wake-up discovery request carries the identification information of the second terminal, the discovery start command to the second terminal corresponding to the identification information.

Optionally, the computer program, when executed by the processor 1201, may further implement the following step:
sending, in a case that the wake-up discovery request does not carry the identification information of the second terminal, the discovery start command to a terminal that has the subscription binding relationship with the first terminal.

Optionally, the computer program, when executed by the processor 1201, may further implement the following steps:
determining, before the sending a discovery start command to the second terminal, a pre-configured default discovery mode as the discovery mode corresponding to the discovery process in a case that the wake-up discovery request does not carry the discovery mode corresponding to the discovery process; and
sending the discovery start command carrying the determined discovery mode to the second terminal.

Optionally, the discovery start command carries at least one of the discovery mode corresponding to the discovery process, the discovery start time, the discovery duration, or the dedicated verification and authentication information.

Optionally, the computer program, when executed by the processor 1201, may further implement the following step:

receiving, before the sending a response message to the first terminal, the discovery start confirm message sent by the second terminal.

Optionally, the discovery start confirm message carries at least one of the discovery mode corresponding to the discovery process, the discovery start time, the discovery duration, or the dedicated verification and authentication information.

Optionally, the computer program, when executed by the processor 1201, may further implement the following step:
sending a first paging message carrying the discovery start command to the second terminal in a case that the second terminal is in an idle state, where the first paging message is used for triggering the second terminal to switch from the current idle state to a connected state and starting the discovery process based on the discovery start command.

Optionally, the computer program, when executed by the processor 1201, may further implement the following step:
sending, before the sending a discovery start command to the second terminal, a second paging message to the second terminal in a case that the second terminal is in an idle state, where the second paging message is used for triggering the second terminal to switch from the current idle state to a connected state.

Optionally, the computer program, when executed by the processor 1201, may further implement the following step:
determining, according to the identification information of the first terminal and the identification information of the second terminal before the sending a discovery start command to the second terminal and in a case that the wake-up discovery request carries the identification information of the first terminal and the identification information of the second terminal, that there is the subscription binding relationship between the second terminal and the first terminal.

Optionally, the computer program, when executed by the processor 1201, may further implement the following steps:
sending, before the receiving a wake-up discovery request sent by a first terminal, pre-configured subscription binding configuration information to the first terminal; and sending, before the sending a discovery start command to the second terminal, the subscription binding configuration information to the second terminal, where
the subscription binding configuration information includes identification information of the first terminal, identification information of the second terminal, and binding group identification information corresponding to the subscription binding relationship.

Optionally, the subscription binding configuration information further includes at least one of the following: capability information of the first terminal, capability information of the second terminal, the dedicated verification and authentication information, or default configuration information.

Preferentially, an embodiment of the present application further provides a terminal device, including a processor, a memory, and a computer program stored in the memory and executable by the processor. The processor is configured to execute the computer program to implement the processes of the embodiments of the foregoing trigger discovery method performed by the terminal device, and the same technical effects can be achieved, which will not be described in detail herein again to avoid repetition.

Preferentially, an embodiment of the present application further provides a network device, including a processor, a memory, and a computer program stored in the memory and executable by the processor. The processor is configured to execute the computer program to implement the processes of the embodiments of the foregoing trigger discovery method performed by the network device, and the same technical effects can be achieved, which will not be described in detail herein again to avoid repetition.

An embodiment of the present application further provides a non-transitory computer-readable storage medium, storing a computer program, where the computer program, when executed by a processor, implements each process of the foregoing embodiments of the trigger discovery method, and the same technical effect can be achieved, which will not be described in detail herein again to avoid repetition. The non-transitory computer-readable storage medium is, for example, a read-only memory ROM), a random access memory (RAM), a magnetic disk, or an optical disc.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of the present application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present application.

The embodiments of the present application are described above with reference to the accompanying drawings. However, the present application is not limited to the foregoing specific implementations. The foregoing specific implementations are illustrative instead of limitative. Enlightened by the present application, a person of ordinary skill in the art can make many forms without departing from the idea of the present application and the scope of protection of the claims. All of the forms fall within the protection of the present application.

What is claimed is:

1. A trigger discovery method, performed by a first terminal and comprising:
sending a wake-up discovery request to a network device, wherein the wake-up discovery request is used for requesting the network device to trigger a second terminal to start a discovery process, and there is a subscription binding relationship between the second terminal and the first terminal; and
starting the discovery process in a case that a response message sent by the network device is received, wherein the response message is used for indicating that the second terminal has started the discovery process;

wherein subscription binding configuration information is pre-configured in the first terminal or a universal subscriber identity module (USIM) card of the first terminal; and the subscription binding configuration information comprises identification information of the first terminal, identification information of the second terminal, and binding group identification information corresponding to the subscription binding relationship; and the subscription binding configuration information further comprises at least one of the following: capability information of the first terminal, capability information of the second terminal, the dedicated verification and authentication information, or default configuration information.

2. The method according to claim 1, wherein the wake-up discovery request carries at least one of identification information of the first terminal, identification information of the second terminal, binding group identification information corresponding to the subscription binding relationship, a discovery mode corresponding to the discovery process, discovery start time, a discovery duration, or dedicated verification and authentication information.

3. The method according to claim 1, wherein the response message carries at least one of a discovery mode corresponding to the discovery process, discovery start time, a discovery duration, or dedicated verification and authentication information; and the starting the discovery process comprises:
starting the discovery process according to the discovery mode in a case that the response message carries the discovery mode;
starting the discovery process according to the discovery start time in a case that the response message carries the discovery start time;
starting, in a case that the response message carries the discovery duration, the discovery process, and sustaining the discovery process according to the discovery duration; and
starting, in a case that the response message carries the dedicated verification and authentication information, the discovery process, and performing verification and authentication on the second terminal in the discovery process based on the dedicated verification and authentication information.

4. The method according to claim 1, wherein before the sending the wake-up discovery request to the network device, the method further comprises:
receiving the subscription binding configuration information configured and sent by the network device.

5. A trigger discovery method, performed by a second terminal and comprising:
receiving a discovery start command sent by a network device, wherein the discovery start command is generated by the network device based on a wake-up discovery request sent by a first terminal, and there is a subscription binding relationship between the second terminal and the first terminal; and
starting a discovery process based on the discovery start command;
wherein subscription binding configuration information is pre-configured in the second terminal or a universal subscriber identity module (USIM) card of the second terminal; and the subscription binding configuration information comprises identification information of the first terminal, identification information of the second terminal, and binding group identification information corresponding to the subscription binding relationship; and the subscription binding configuration information further comprises at least one of the following: capability information of the first terminal, capability information of the second terminal, the dedicated verification and authentication information, or default configuration information.

6. The method according to claim 5, wherein the wake-up discovery request carries at least one of identification information of the first terminal, identification information of the second terminal, binding group identification information corresponding to the subscription binding relationship, a discovery mode corresponding to the discovery process, discovery start time, a discovery duration, or dedicated verification and authentication information.

7. The method according to claim 5, wherein the discovery start command carries at least one of a discovery mode corresponding to the discovery process, discovery start time, a discovery duration, or dedicated verification and authentication information; and the starting a discovery process comprises:
starting the discovery process according to the discovery mode in a case that the discovery start command carries the discovery mode;
starting the discovery process according to the discovery start time in a case that the discovery start command carries the discovery start time;
starting, in a case that the discovery start command carries the discovery duration, the discovery process, and sustaining the discovery process according to the discovery duration; and
starting, in a case that the discovery start command carries the dedicated verification and authentication information, the discovery process, and performing verification and authentication on the first terminal in the discovery process based on the dedicated verification and authentication information;
wherein before the starting a discovery process, the method further comprises:
determining a pre-configured default discovery mode as the discovery mode in a case that the discovery start command does not carry the discovery mode.

8. The method according to claim 5, wherein after the starting a discovery process, the method further comprises:
sending a discovery start confirm message to the network device, wherein the discovery start confirm message is used for indicating that the second terminal has started the discovery process, and the discovery start confirm message carries at least one of a discovery mode corresponding to the discovery process, discovery start time, a discovery duration, or dedicated verification and authentication information.

9. The method according to claim 5, wherein before the receiving the discovery start command sent by the network device, the method further comprises:
receiving the subscription binding configuration information configured and sent by the network device.

10. A trigger discovery method, performed by a network device and comprising:
receiving a wake-up discovery request sent by a first terminal, wherein the wake-up discovery request is used for requesting the network device to trigger a second terminal to start a discovery process, and there is a subscription binding relationship between the second terminal and the first terminal;

sending a discovery start command to the second terminal based on the wake-up discovery request; and sending a response message to the first terminal after the second terminal starts the discovery process based on the discovery start command, wherein the response message is used for indicating that the second terminal has started the discovery process.

11. The method according to claim 10, wherein the wake-up discovery request carries at least one of identification information of the first terminal, identification information of the second terminal, binding group identification information corresponding to the subscription binding relationship, a discovery mode corresponding to the discovery process, discovery start time, a discovery duration, or dedicated verification and authentication information.

12. The method according to claim 11, wherein the sending the discovery start command to the second terminal comprises:

sending, in a case that the wake-up discovery request carries the identification information of the second terminal, the discovery start command to the second terminal corresponding to the identification information; or sending, in a case that the wake-up discovery request does not carry the identification information of the second terminal, the discovery start command to a terminal that has the subscription binding relationship with the first terminal.

13. The method according to claim 11, wherein before the sending the discovery start command to the second terminal, the method further comprises:

determining a pre-configured default discovery mode as the discovery mode corresponding to the discovery process in a case that the wake-up discovery request does not carry the discovery mode corresponding to the discovery process; and the sending the discovery start command to the second terminal comprises:

sending the discovery start command carrying a determined discovery mode to the second terminal;

and/or before the sending the discovery start command to the second terminal, the method further comprises:

sending a second paging message to the second terminal in a case that the second terminal is in an idle state, wherein the second paging message is used for triggering the second terminal to switch from a current idle state to a connected state.

14. The method according to claim 11, wherein before the sending the discovery start command to the second terminal, the method further comprises:

determining, according to the identification information of the first terminal and the identification information of the second terminal in a case that the wake-up discovery request carries the identification information of the first terminal and the identification information of the second terminal, that there is the subscription binding relationship between the second terminal and the first terminal.

15. The method according to claim 10, wherein the discovery start command carries at least one of a discovery mode corresponding to the discovery process, discovery start time, a discovery duration, or dedicated verification and authentication information.

16. The method according to claim 10, wherein before the sending the response message to the first terminal, the method further comprises:

receiving a discovery start confirm message sent by the second terminal; wherein the discovery start confirm message carries at least one of a discovery mode corresponding to the discovery process, discovery start time, a discovery duration, or dedicated verification and authentication information.

17. The method according to claim 10, wherein the sending the discovery start command to the second terminal comprises:

sending a first paging message carrying the discovery start command to the second terminal in a case that the second terminal is in an idle state, wherein the first paging message is used for triggering the second terminal to switch from a current idle state to a connected state and starting the discovery process based on the discovery start command.

18. The method according to claim 10, further comprising:

sending, before the receiving the wake-up discovery request sent by the first terminal, pre-configured subscription binding configuration information to the first terminal; and sending, before the sending the discovery start command to the second terminal, the subscription binding configuration information to the second terminal, wherein the subscription binding configuration information comprises identification information of the first terminal, identification information of the second terminal, and binding group identification information corresponding to the subscription binding relationship; and the subscription binding configuration information further comprises at least one of the following: capability information of the first terminal, capability information of the second terminal, dedicated verification and authentication information, or default configuration information.

19. A first terminal device, comprising:

a memory, storing computer program instructions; and a processor, when executing the computer program instructions, implementing the trigger discovery method according to claim 1.

20. A second terminal device, comprising:

a memory, storing computer program instructions; and a processor, when executing the computer program instructions, implementing the trigger discovery method according to claim 5.

* * * * *